United States Patent [19]

Kleber

[11] Patent Number: 4,793,229
[45] Date of Patent: Dec. 27, 1988

[54] MULTIFUNCTIONAL WEB ROTARY MODULE

[75] Inventor: E. Bruce Kleber, Wheaton, Ill.

[73] Assignee: Western Printing Machinery Company, Schiller Park, Ill.

[21] Appl. No.: 946,381

[22] Filed: Dec. 24, 1986

[51] Int. Cl.⁴ .............................................. B23D 25/12
[52] U.S. Cl. ...................................... 83/344; 83/345; 83/346; 83/348; 83/368
[58] Field of Search ................ 83/344, 345, 348, 346, 83/659, 72, 74, 360, 368

[56] References Cited

U.S. PATENT DOCUMENTS

| | | | |
|---|---|---|---|
| 3,728,918 | 4/1973 | Helm | 83/22 |
| 3,867,860 | 2/1975 | Haug | 83/368 |
| 4,073,207 | 2/1978 | Kirkpatrick | 83/659 |
| 4,171,655 | 10/1979 | Voorhees | 83/344 |
| 4,188,843 | 2/1980 | Dickey | 83/344 |
| 4,205,596 | 6/1980 | Chesnut | 83/344 |
| 4,485,710 | 12/1984 | Schlisio et al. | 83/346 |

Primary Examiner—Frank T. Yost
Assistant Examiner—Eugenia A. Jones
Attorney, Agent, or Firm—Tilton, Fallon, Lungmus & Chesnut

[57] ABSTRACT

A multipurpose web rotary module comprising a die cylinder and an interchangeable anvil cylinder assembly located above said die cylinder, said anvil cylinder assembly being interchangeable so several diverse functions can be performed, namely, die cutting, perforating, embossing, scoring.

7 Claims, 4 Drawing Sheets

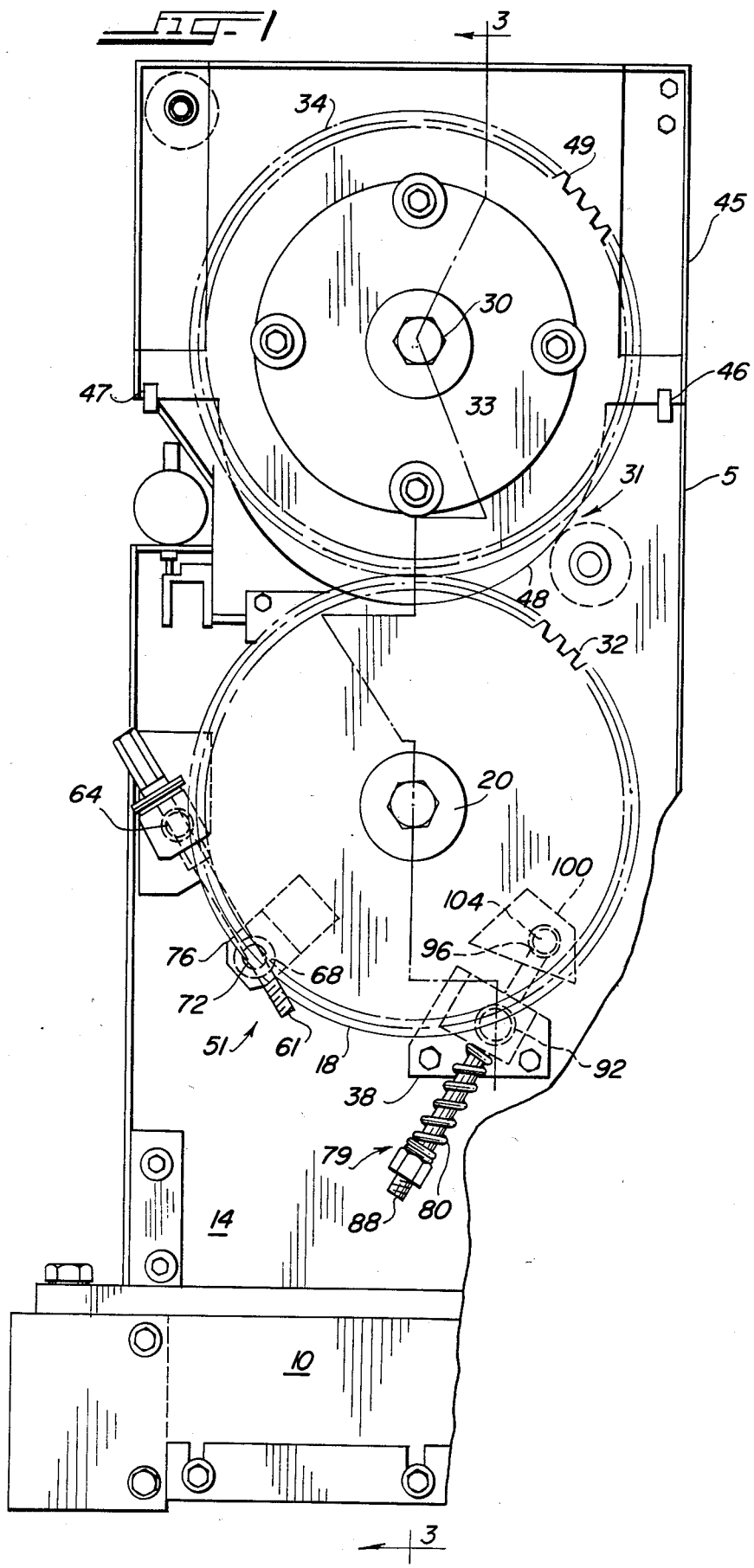

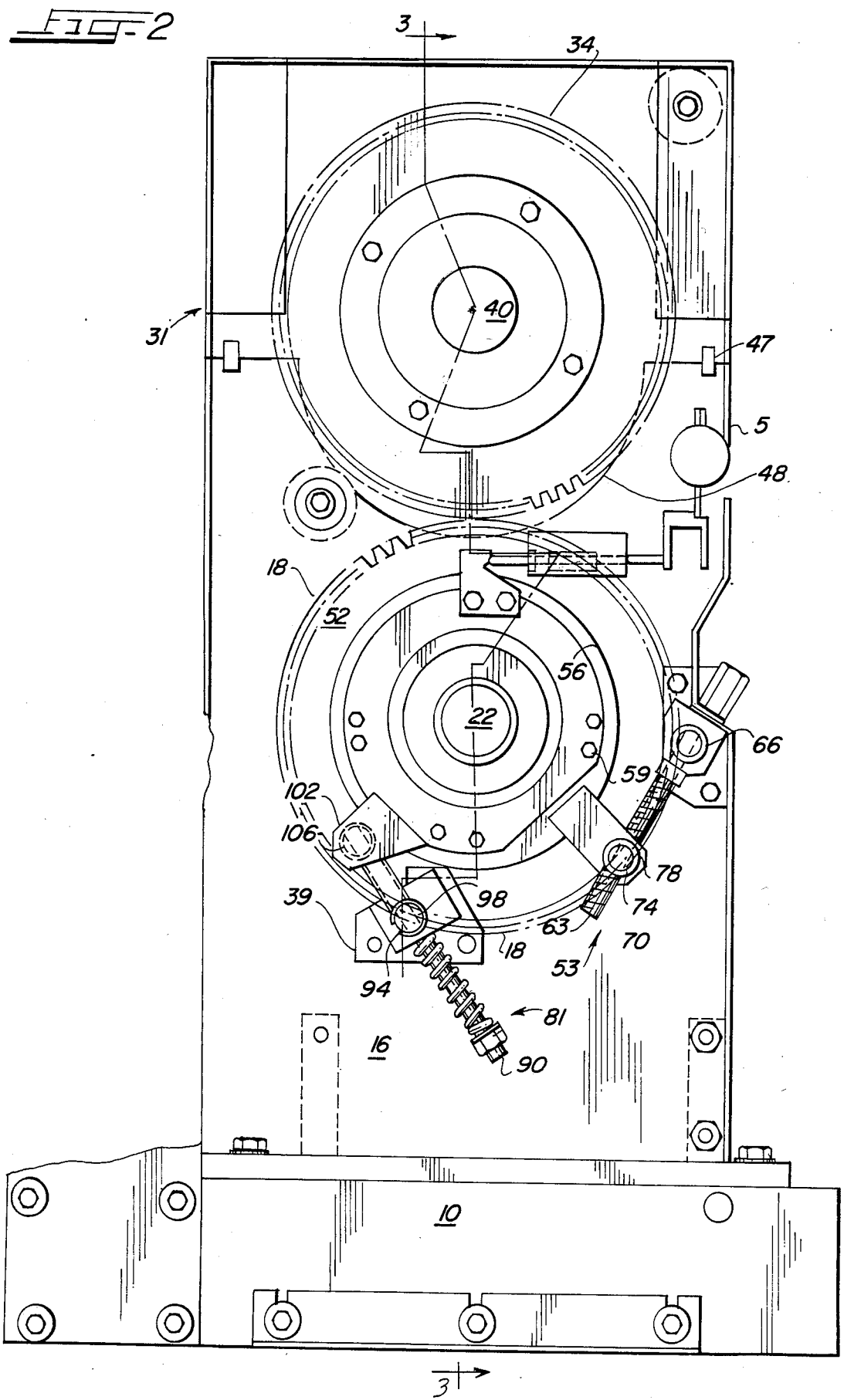

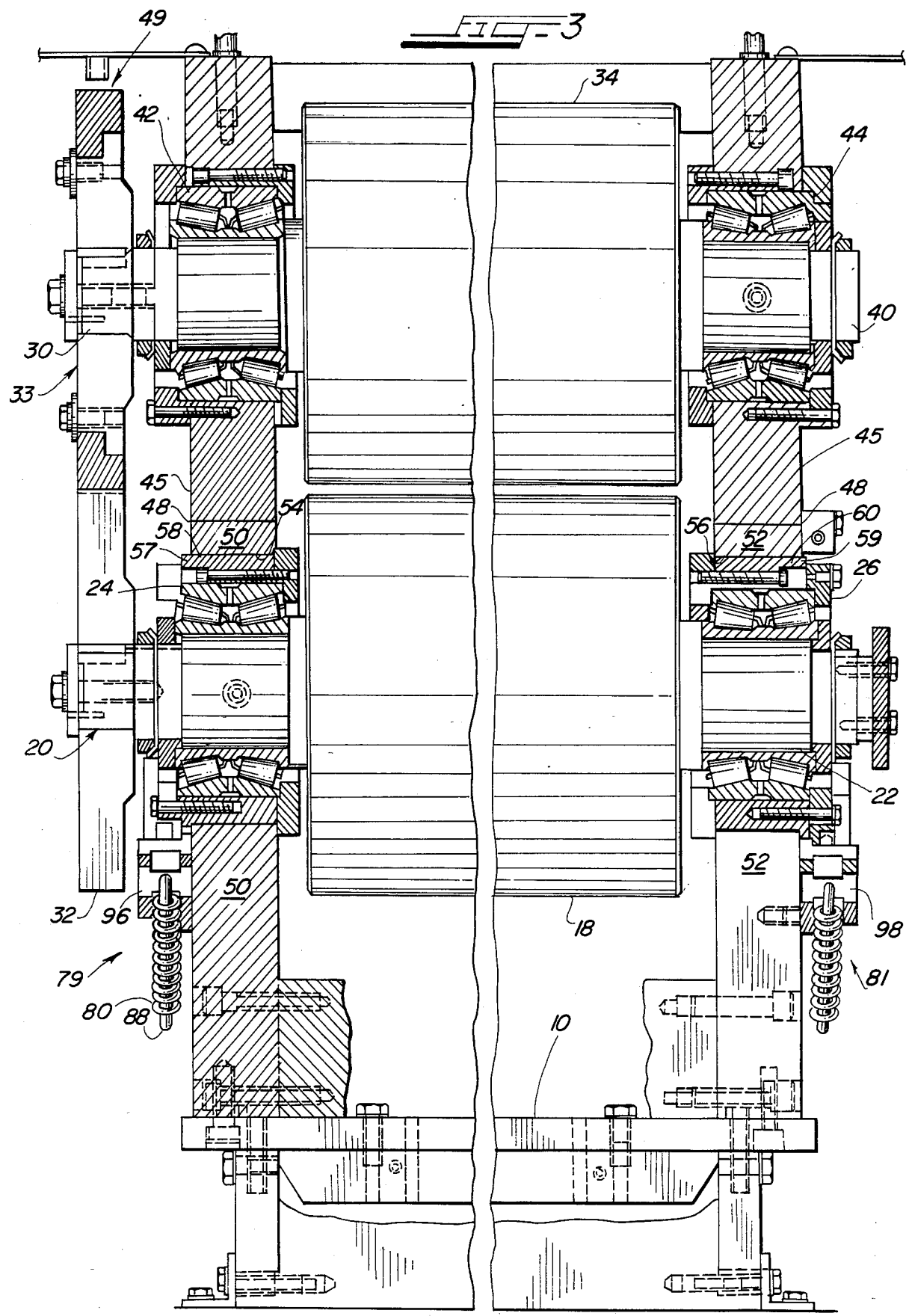

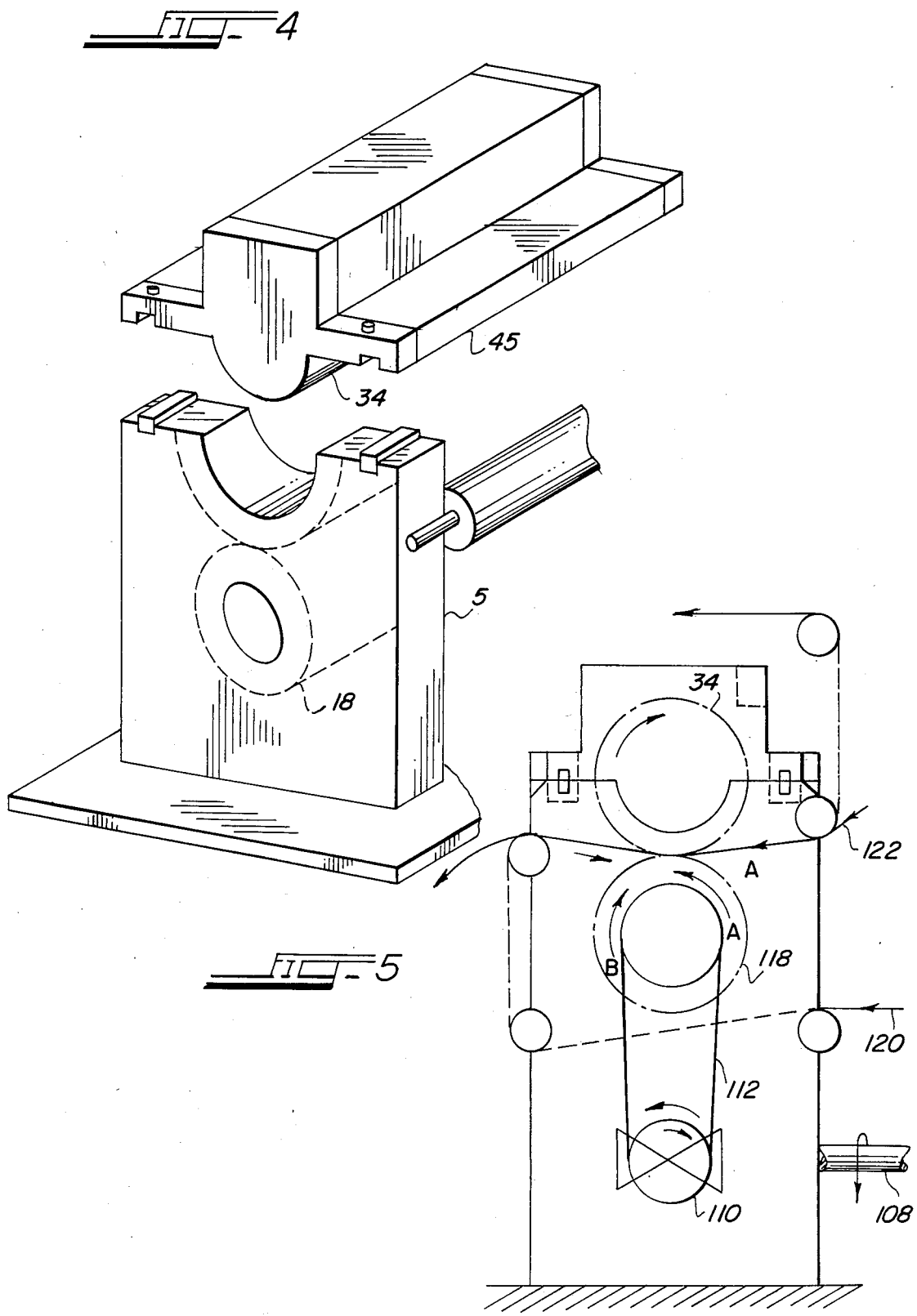

MULTIFUNCTIONAL WEB ROTARY MODULE

BACKGROUND OF THE INVENTION

Web rotary die cutting and perforating modules are in common use in commercial web printing operations. The usual module supports the anvil cylinder below the plane of a web feed line and the die cylinder above. If embossing or scoring effects are desired, there is no obvious proven method for performing these operations on such an apparatus.

In rotary die cutting or perforating, the diameter of the anvil cylinder should be sized so that its surface speed is equal to that of the web material. The use of an anvil or impression cylinder of full pitch height (diameter)—such as is used for die cutting and perforating—is unsatisfactory for operations such as embossing or scoring. For embossing or scoring, the cylinder must be "undercut" or slightly reduced in diameter to allow for the thickness of the counterpart or "makeready" which operates in conjunction with the basic embossing or scoring die affixed to the die cylinder. Conversely, if the counterpart element is affixed to an anvil cylinder of full pitch height, the surface speed of the counterpart exceeds that of the paper web or other material run through the rotary nip. This mismatch of surface rotational speeds may cause tearing of the web and damage to the counterpart. The so-called "counterpart", as contemplated for use in commercial web printing and similar operations may be either a male embossing element or a female scoring element.

In embossing operations, the curved rigid embossing die plate is secured to the die cylinder by die fastening screw clips or similar means. An overall "honeycomb" pattern of tapped holes can be provided on the die cylinder so that the embossing die may be located (by x-y coordinates) and fastened in the desired position to register with the printed web. Normally, the embossing die will be of the female or intaglio type so that the side of the paper web which is, in practice, pushed into the recesses of the curved die, will be raised in relief. The "pushing" or displacement is done by the counterpart or male makeready element which is formed on the anvil cylinder. As one example, the embossing counterpart is initially formed in the makeready steps by applying a paste of semi-liquid epoxy or similar plastic to the anvil cylinder so that it will be "squished" or formed when rolled into contact with the female embossing die(s) fastened to the die cylinder. Prior to this, the face of the female embossing die has been coated with a release agent or oil to prevent the plastic from adhering to its face. After the impression of the female die has been impressed so as to create a mating male counterpart in the plastic makeready, the latter is allowed to harden and then is trimmed away from all non-embossed areas.

The rotary embossing equipment should be of the adjustable centers type, such as that disclosed in U.S. Pat. No. 4,171,655, so that the two cylinders with the respective mating embossing elements can be separated by an amount equal to the thickness of the paper stock. This assures that the embossing will be accomplished by a male/female displacement of the embossed image area(s) but that the paper stock will not be compressed and possibly cracked in these areas.

In the procedure of scoring, male and female co-acting elements are similarly required; the male scoring rule—as part of the curved die plate fastened to the die cylinder—displaces the paper stock into the female grooved material affixed to the anvil or impression cylinder. The female scoring counterpart, sometimes a pre-grooved "matrix" material, with sticky back adhesive, causes the paper stock to be linearly "de-bossed" or pressed down when co-acting with the male scoring cylinder in proper register relationship to the male score. The thickness of the scoring matrix material similarly requires that the anvil cylinder be slightly undercut; i.e., reduced in diameter, so that the surface speed of the "top" outer diameter of the matrix is "correct". Hence, the need to have a separate, full sized diameter anvil or impression cylinder for die cutting/perforating and another anvil cylinder of slightly smaller diameter for embossing/scoring operations.

In conventional rotary modules, for die cutting, it is common to use removable cylinders mounted in movable bearing blocks, which in turn are supported in slotted frames. The die cylinder usually is placed above the anvil cylinder and the die cylinder is equipped with bearer rings which rotate against the smooth body of the anvil cylinder when locked in operating position.

For reasons of greater stability, micro-adjustability of cylinder center distance and improved performance, a different type of module construction is favored. In accordance with the present invention, the upper anvil cylinder, complete with pre-loaded bearings, is mounted in its own end frames. The assembly is cross-braced for rigidity. When the upper cylinder requires changing, the complete box assembly can be easily put in place rather than requiring the services of a skilled machinist.

The lower die cylinder is permanently mounted in the main frames of the module, including a mounting which allows the cylinder to be micro-adjusted toward or away from the anvil cylinder so as to minutely alter, when required, the distance between the cylinders.

The micro adjustment mechanism is described in U.S. Pat. No. 4,171,655, which is incorporated herein by reference.

It is desirable to have one multipurpose module for performing die cutting, perforating, embossing and scoring functions with interchangeable anvil cylinder assemblies.

SUMMARY OF THE INVENTION

This invention relates to a multipurpose module that permits the interchanging of different sized anvil cylinder assemblies that are capable of performing several functions with the same lower die cylinder. For example, the anvil cylinder assemblies may be utilized for die cutting, perforating, embossing or scoring. Further, the web path can be reversed to allow for alternate web paths to enable scoring or embossing from either side of the web.

Therefore, it is an object of this invention to provide a module in which may fit interchangeable anvil cylinder assemblies coacting with and above a die cylinder.

Another object of the present invention is to provide a die cylinder in a position opposed and lower than said anvil cylinder for affixing cutting, perforating, embossing or scoring dies thereon.

Another object of this invention is to provide a module, including interchangeable anvil cylinder assemblies, with alternate web paths for processing top or bottom of web, including a reversible drive mechanism to change direction of cylinder rotation.

Another object of this invention is to provide a module with microadjustability of the center distance between the opposing cylinders, plus means to detect the presence of web splices and automatically open up the center distance momentarily, throwing off impression so as to avoid damage by splices to dies and counterparts when embossing or scoring.

BRIEF DESCRIPTION OF THE DRAWINGS

FIG. 1 is a left-side view of the module showing the interchangeable anvil cylinder assembly, die cylinder assembly and stabilized center-distance adjuster of this invention;

FIG. 2 is a right side view of the same;

FIG. 3 is a fragmentary front view of the same along lines 3—3 of FIG. 1.

FIG. 4 is an exploded view of an interchangeable anvil cylinder assembly and module of this invention; and FIG. 5 is a schematic showing the alternate web paths capable of being utilized with this invention.

DESCRIPTION OF THE PREFERRED EMBODIMENTS

Referring now to FIG. 1, there is shown the left side view of a module 5 having a base 10 upon which a drive side 14 is erected in spaced parallel relation to an operating side 16 erected at the opposite end thereof, as shown in FIG. 3. A die cutting cylinder 18, having journals 20 and 22 extending from each end of said cylinder in mutual concentric relation therewith, rotates in tapered roller bearings 24 and 26, respectively, which are installed in spaced and aligned relation on each of said journals 20 and 22 in eccentric housings 57 and 59 which mount in side plates 50 and 52 in the module 5, as shown in FIG. 2.

An interchangeable anvil cylinder 34, also having journals 30 and 40 extending from each end thereof in mutual concentric relation therewith, rotates in over-and-under relation to the die cutting cylinder 18 in tapered roller bearings 42 and 44 which are in aligned relation on each shaft 30 and 40, respectively. The anvil cylinder has a 1:1 revolution ratio with the die cylinder permanently mounted in base module 5.

Anvil cylinder 34 has its axis of rotation in parallel and spaced relation to that of die cylinder 18 so that the center-distance between the two axis equals the working diameter of die cylinder 18. In rotary die cutting or perforating, the diameter of anvil cylinder 34 is sized so that its surface speed is equal to that of the web material. Interchangeable assembly 45, a subassembly of module 5, includes end frames with bearings, cross braces, drive gear, guards and anvil cylinder 34. Removable assembly 45 has recesses (not numbered) which receive keys 46 and 47 respectively which are secured by bolts for aligning assembly 45 with base module. In rotary die cutting or perforating, the diameter of the anvil cylinder 34 should be sized so that its surface speed is equal to that of the web material. The use of an anvil cylinder of full pitch height is unsatisfactory for operations such as embossing or scoring. For embossing, the cylinder must be "undercut" or slightly reduced in diameter to allow for the thickness of the counterpart or "make ready" which when affixed to the anvil cylinder operates in conjunction with the basic embossing or scoring die affixed to the die cylinder 18. In this regard, assembly 45 (with full size and diameter for die cutting) may be easily removed from module 5 to be interchanged with another anvil cylinder assembly to be used for the embossing operation (not shown). Break line 48 indicates the point of separation of housing 45 and module 5.

Embossing dies may be fastened to die cylinder 18 for contacting the web.

Similarly, for scoring operations, the anvil cylinder should be slightly undercut, that is, reduced in diameter, so that the surface speed or the speed of the outer diameter female scoring counterpart material attached to the anvil cylinder coincides with the male scoring element attached to the die cylinder.

Generally, gear pair 31 comprises a driven spur gear 32 having the same pitch diameter as the working diameter of cylinder 18, which mounts in keyed relation to the journal 20, adjacent to the outside of drive side 16 of the module, as shown in FIGS. 1 and 2, and driven by spur gear 49 which likewise has the same pitch diameter as gear 32 and mounts on hub 33 which mounts in keyed relation on journal 30 adjacent to the outside surface of the drive side 14 of the same. The working diameter refers to the diameter over the dies mounted on the cylinder. The actual diameter of cylinder 18 is "undercut" below the peripheral diameter of the gear to accommodate the thickness of the cutting die, embossing die, etc. A typical die undercut is 0.375 inches. Spur gear 49 operationally meshes with spur gear 32, as shown in FIGS. 1 and 3 to coordinate the rotational position of the anvil cylinder 34 with the die cylinder 18. A drive gear (not shown) operationally meshes with gear 32 for positive transmission of rotary power from a prime mover (not shown) to the module. Reference to FIGS. 1 and 3 shows a conventional eccentricity adjusting means 51 and 53 mounted about the axis of the die cylinder 18 of both the drive and the operating sides 14 and 16 of the module, respectively, for adjusting the center-distance between the axis of the die cylinder 18 and the anvil cylinder 34, respectively. Eccentricity adjusting means 51 and 53 comprise plates 50 and 52 which are side frames of ends 14 and 16 of module 5, respectively, having in-line through bores 54 and 56, as shown in FIG. 2, which are centered at point 54' (not shown) and 56', respectively, in an offset relation to the axis of anvil cylinder 34 which is centered at point 18' in the direction towards the front of the module 5. Eccentric housings 57 and 59 mount in the bores 54 and 56 having working clearances 58 and 60, respectively, between the outer diameter thereof and the inner diameter of said bores, as shown in FIG. 2. Bearings 24 and 26, which are mounted in and supported by bores in the eccentric housings 57 and 59, support the journals 20 and 22 in the axis of cylinder 18.

Screw 61 and 63 of eccentricity adjusting means 51 and 53, respectively, pivotally mounted adjacent their hexed ends against one side of the first pivot pin 64 and 66. Pin 64 and 66 are pivotally mounted on and extend outwardly from the side of sideplates 50 and 52 in a direction parallel to the axis of cylinders 18 and 34 on both the drive and operating sides 14 and 16 respectively. The threaded ends of said screw 61 and 63 are anchored in and engage the threaded transverse bore 68 and 70 and second pivot pin 72 and 74 which pivotally mount on an adjusting ears 76 and 78 which are a part of eccentric housings 57 and 59, respectively. Pins 52 and 74 extend out from the side of eccentric housings 57 and 59 having their axis parallel to the axis of cylinders 18 and 34 and in space relation with bore cylinder 56' and the axis of cylinder on 18'.

FIGS. 1, 2 and 3 shown an eccentric load biasing means 79 and 81 comprises adjustable compression springs 80 and 82 each of which is mounted on rods 88 and 90, respectively, and is restrained at one end thereof by jam nut fasteners 84 and 86 threaded to rods 88 and 90. Rods 88 and 90 are guided at their midlength by and are free to slide axially within transverse sliding bores 92 and 94 and third pivot pins 96 and 98 which mount on brackets 38 and 39 which are mounted on the drive side 14 and operating side 16, respectively, and aligned in a direct parallel to the axes of cylinders 18 and 34. Load biasing ears 100 and 102 are part of and extend out from the side of eccentric housings 57 and 59 having their axis parallel to the axis of cylinders 18 and 34 and in spaced relation with bore centers 54' and 56' and the axis of cylinder 18 but not coincident with the axis of pin 72 and 74 on ear 76 and 78, respectively. The other ends of said rods 88 and 90 are engaged and anchored in the fourth pivotal pins 104 and 106 which mount on load biasing ears 100 and 102 on the drive side 14 and operating side 16, respectively. The other ends of said compression springs 80 and 82 are restrained against the sides of the third pivot pins 96 and 98 at the junctures of transverse sliding bores 92 and 94 with rods 88 and 90.

In operation, once an anvil cylinder is replaced for a specific job, the eccentricity adjusting means and load biasing means can be adjusted to produce a force having the same general direction as the applied load between the cylinders.

In embossing and scoring, there is the tendency of the mating die and counterpart to become circumferentially misregistered from each other. The true pitch line of the paper flowing between these mating elements will not necessarily coincide with the pitch line of the gears driving the cylinders. Thus it is useful, in order to avoid damage to the counterpart, to use a conventional anti-backlash gear (not shown) for one of the mating gears. Such a gear can be mounted on the anvil cylinder journal 30 of the changeable cylinder assembly 45. It has a spring loaded compound or split gear which tends to overcome the tendency of the driven gear to move backward through the backlash zone between gear teeth and thus prevent misregister between the mating elements in the presence of momentary speed differences between the elements.

Further, another conventional device may be utilized with the present invention. Means for a timed trip-off of the impression contact of a web splice may be utilized. Infrequently, a splice consisting of a lap of two web thicknesses, plus one or two thicknesses of splicing tape may occur in a mill roll. The mating embossing or scoring die and counterparts are operationally spaced one web thickness apart; the passage of multiple layers of material through the embossing nip could damage the die and/or counterpart. Therefore, the use of a splice detecting caliper to sense the presence in the web of a splice "well ahead" of the embossing nip can be utilized. A timing control is triggered to subsequently (shortly before arrival of splice at the nip) "trip" the module off impression. This means opening up the center distance between cylinders an adequate amount of perhaps 0.020"–0.025", and then moving the lower cylinder back to the operating position after a short time delay.

FIG. 4 describes an exploded view of an anvil cylinder 34 in interchangeable assembly 45 spaced apart from die cylinder 18 in a partial view of module 5. Housing 45 and anvil cylinder 34 can be lifted from module 5 in a facile manner for replacement with a different sized anvil cylinder assembly without the aid of a skilled machinist for the bearings for operating the anvil are intact in housing 45. Keys 46 and 47 are removed from housing 45 and base module 5 for replacement of housing 45.

FIG. 5 describes a schematic representation of the web paths that are capable when using the module of the present inveniton. Main drive 108 from a parent machine supplies power to reversing gear box 110 which powers timing belt 112 to rotate die cylinder 18 and move anvil cylinder 34 in a counter direction. Alternate web path 120 may be utilized to process the bottom of the web path 122 by reversing the drive mechanism.

While the invention has been particularly shown and described with reference to a preferred embodiment, it will be understood by those skilled in the art that various changes in form and details may be made therein without departing from the spirit and scope of the invention.

What is claimed is:

1. A multipurpose web rotary apparatus comprising, in combination,
a base frame structure having a permanently positioned die cylinder assembly rotatably mounted therein;
and a preassembled anvil cylinder assembly with an impression or anvil cylinder and gear assembly removably located above said die cylinder assembly and on top of the base frame structure, said anvil cylinder assembly having means which engages corresponding means on said base frame structure for aligning said anvil cylinder with said die cylinder that may be disengaged so that said anvil cylinder assembly may be easily removed and replaced.

2. The apparatus of claim 1 wherein the diameter of the anvil cylinder in said removable assembly is sized so that its surface speed of rotation is equal to the speed of the web material passing through said apparatus.

3. The apparatus of claim 1 including adjusting means for center-distance adjustment of the die and anvil cylinders.

4. The apparatus of claim 3 wherein the adjusting means for adjustment of center distance between the die and anvil cylinders is arranged to automatically throw the die cylinder off impression for a brief interval thereby increasing the center distance by a small amount sufficient to allow the passage of any splices in the web, so that the die and anvil cylinders will not be damaged by the increased web thickness.

5. The apparatus of claim 1 wherein the anvil cylinder assembly contains a removable anvil cylinder having an undercut sized cylinder.

6. The apparatus of claim 1 wherein said gear assembly and said anvil cylinder are removable from said anvil cylinder assembly, said gear assembly and anvil cylinder having a full sized diameter equal to the pitch diameter of means utilized to drive said apparatus.

7. The apparatus of claim 1 wherein the anvil cylinder and gear assembly have a like pitch diameter.

* * * * *